US009852225B2

(12) United States Patent
Koningstein et al.

(10) Patent No.: US 9,852,225 B2
(45) Date of Patent: Dec. 26, 2017

(54) ASSOCIATING FEATURES WITH ENTITIES, SUCH AS CATEGORIES OF WEB PAGE DOCUMENTS, AND/OR WEIGHTING SUCH FEATURES

(71) Applicant: Google Inc., Mountain View, CA (US)

(72) Inventors: Ross Koningstein, Menlo Park, CA (US); Stephen Lawrence, Mountain View, CA (US); Valentin Spitkovsky, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 257 days.

(21) Appl. No.: 14/694,534

(22) Filed: Apr. 23, 2015

(65) Prior Publication Data

US 2015/0317679 A1 Nov. 5, 2015

Related U.S. Application Data

(63) Continuation of application No. 11/026,497, filed on Dec. 30, 2004, now abandoned.

(51) Int. Cl.
*G06F 17/30* (2006.01)
*G06Q 30/02* (2012.01)

(52) U.S. Cl.
CPC ....... *G06F 17/30867* (2013.01); *G06Q 30/02* (2013.01); *G06Q 30/0242* (2013.01); *G06Q 30/0256* (2013.01); *G06Q 30/0277* (2013.01)

(58) Field of Classification Search
CPC .............. G06F 17/30867; G06Q 30/02; G06Q 30/0242

(Continued)

(56) References Cited

U.S. PATENT DOCUMENTS 5,371,807 A 12/1994 Register et al.
5,659,732 A 8/1997 Kirsch
(Continued)

FOREIGN PATENT DOCUMENTS

EP 1 367 509 8/2005
JP 2004-152041 5/2004
(Continued)

OTHER PUBLICATIONS

Office Action issued in European Application No. 05854841.3 dated Dec. 10, 2015, 5 pages.
(Continued)

*Primary Examiner* — Shahid Alam
(74) *Attorney, Agent, or Firm* — Fish & Richardson P.C.

(57) ABSTRACT

Features that may be used to represent relevance information (e.g., properties, characteristics, etc.) of an entity, such as a document or concept for example, may be associated with the document by accepting an identifier that identifies a document; obtaining search query information (and/or other serving parameter information) related to the document using the document identifier, determining features using the obtained query information (and/or other serving parameter information), and associating the features determined with the document. Weights of such features may be similarly determined. The weights may be determined using scores. The scores may be a function of one or more of whether the document was selected, a user dwell time on a selected document, whether or not a conversion occurred with respect to the document, etc. The document may be a Web page. The features may be n-grams. The relevance information of the document may be used to target the serving of advertisements with the document.

15 Claims, 8 Drawing Sheets

(58) Field of Classification Search
USPC .................................. 707/723; 705/14.41
See application file for complete search history.

(56) References Cited

U.S. PATENT DOCUMENTS

| | | |
|---|---|---|
| 5,713,016 A | 1/1998 | Hill |
| 5,724,521 A | 3/1998 | Dedrick |
| 5,740,549 A | 4/1998 | Reilly et al. |
| 5,848,396 A | 12/1998 | Gerace |
| 5,848,397 A | 12/1998 | Marsh et al. |
| 5,918,014 A | 6/1999 | Robinson |
| 5,920,859 A | 7/1999 | Li |
| 5,943,670 A | 8/1999 | Prager |
| 5,948,061 A | 9/1999 | Merriman et al. |
| 5,991,735 A | 11/1999 | Gerace |
| 5,999,925 A | 12/1999 | Evans |
| 6,003,027 A | 12/1999 | Prager |
| 6,012,053 A | 1/2000 | Pant et al. |
| 6,026,368 A | 2/2000 | Brown et al. |
| 6,044,376 A | 3/2000 | Kurtzman, II |
| 6,078,866 A | 6/2000 | Buck et al. |
| 6,078,914 A | 6/2000 | Redfern et al. |
| 6,119,114 A | 9/2000 | Smadja |
| 6,134,532 A | 10/2000 | Lazarus et al. |
| 6,144,944 A | 11/2000 | Kurtzman et al. |
| 6,167,382 A | 12/2000 | Sparks et al. |
| 6,182,067 B1 | 1/2001 | Presnell et al. |
| 6,256,633 B1 | 7/2001 | Dharap |
| 6,269,361 B1 | 7/2001 | Davis et al. |
| 6,311,194 B1 | 10/2001 | Sheth et al. |
| 6,327,590 B1 | 12/2001 | Chidlovskii et al. |
| 6,397,209 B1 | 5/2002 | Reed et al. |
| 6,401,075 B1 | 6/2002 | Mason et al. |
| 6,473,751 B1 | 10/2002 | Nikolovska et al. |
| 6,484,164 B1 | 11/2002 | Nikolovska et al. |
| 6,489,968 B1 | 12/2002 | Ortega et al. |
| 6,584,471 B1 | 6/2003 | Maclin et al. |
| 6,651,057 B1 | 11/2003 | Jin et al. |
| 6,654,735 B1 | 11/2003 | Eichstaedt et al. |
| 6,732,090 B2 | 5/2004 | Shanahan et al. |
| 6,799,176 B1 | 9/2004 | Page et al. |
| 6,839,680 B1 | 1/2005 | Liu et al. |
| 6,865,571 B2 | 3/2005 | Inaba et al. |
| 6,901,398 B1 | 5/2005 | Horvitz et al. |
| 6,968,332 B1 | 11/2005 | Milic-Frayling et al. |
| 6,985,882 B1 | 1/2006 | Del Sesto |
| 7,007,074 B2 | 2/2006 | Radwin et al. |
| 7,039,599 B2 | 5/2006 | Merriman et al. |
| 7,047,242 B1 | 5/2006 | Ponte et al. |
| 7,054,860 B2 | 5/2006 | Inaba et al. |
| 7,058,628 B1 | 6/2006 | Page et al. |
| 7,136,875 B2 | 11/2006 | Anderson et al. |
| 7,293,013 B1 | 11/2007 | Horvitz et al. |
| 7,546,294 B2 | 6/2009 | Hullender et al. |
| 2002/0099600 A1 | 7/2002 | Merriman et al. |
| 2002/0107735 A1 | 8/2002 | Henkin et al. |
| 2002/0123988 A1 | 9/2002 | Dean et al. |
| 2002/0147895 A1 | 10/2002 | Glance et al. |
| 2002/0198875 A1 | 12/2002 | Masters |
| 2003/0018659 A1 | 1/2003 | Fuks et al. |
| 2003/0046161 A1 | 3/2003 | Kamangar et al. |
| 2003/0050863 A1 | 3/2003 | Radwin |
| 2003/0078928 A1 | 4/2003 | Dorosario et al. |
| 2003/0182310 A1 | 9/2003 | Charnock et al. |
| 2003/0216930 A1 | 11/2003 | Dunham et al. |
| 2003/0217052 A1 | 11/2003 | Rubenczyk et al. |
| 2004/0059708 A1 | 3/2004 | Dean et al. |
| 2004/0059712 A1 | 3/2004 | Dean et al. |
| 2004/0093327 A1* | 5/2004 | Anderson ............ G06Q 30/02 707/704 |
| 2004/0167928 A1 | 8/2004 | Anderson et al. |
| 2004/0267723 A1 | 12/2004 | Bharat |
| 2005/0033657 A1 | 2/2005 | Herrington et al. |
| 2005/0033771 A1 | 2/2005 | Schmitter et al. |
| 2005/0060311 A1 | 3/2005 | Tong et al. |
| 2005/0065916 A1 | 3/2005 | Ge et al. |
| 2005/0071741 A1 | 3/2005 | Acharya et al. |
| 2005/0076003 A1 | 4/2005 | DuBose et al. |
| 2005/0080774 A1 | 4/2005 | Janssen et al. |
| 2005/0091106 A1 | 4/2005 | Reller et al. |
| 2005/0137939 A1 | 6/2005 | Calabria et al. |
| 2005/0144158 A1 | 6/2005 | Capper et al. |
| 2005/0149388 A1 | 7/2005 | Scholl |
| 2005/0222989 A1 | 10/2005 | Haveliwala et al. |
| 2005/0234904 A1 | 10/2005 | Brill et al. |
| 2006/0015401 A1 | 1/2006 | Chu et al. |
| 2006/0031183 A1 | 2/2006 | Oral et al. |
| 2006/0031253 A1 | 2/2006 | Newbold et al. |
| 2006/0036659 A1 | 2/2006 | Capriati et al. |
| 2006/0036966 A1 | 2/2006 | Yevdayev |
| 2006/0074868 A1 | 4/2006 | Khaliq et al. |
| 2007/0016578 A1 | 1/2007 | Melman |
| 2007/0198526 A1 | 8/2007 | Pitkow |
| 2008/0065609 A1 | 3/2008 | Jenkins et al. |

FOREIGN PATENT DOCUMENTS

| | | |
|---|---|---|
| KR | 2004-0104060 | 12/2004 |
| WO | WO-97/21183 A | 6/1997 |
| WO | WO-97/41673 | 11/1997 |
| WO | WO-03/010689 | 2/2003 |
| WO | WO-03/023680 | 3/2003 |
| WO | WO-2004/111771 | 12/2004 |

OTHER PUBLICATIONS

U.S. Appl. No. 95/001,061, Reexamination of Stone et al.
U.S. Appl. No. 95/001,068, Reexamination of Stone et al.
U.S. Appl. No. 95/001,069, Reexamination of Stone et al.
U.S. Appl. No. 95/001,073, Reexamination of Stone et al.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www. Archive.org, Apr. 12, 1997 and Feb. 1, 1997.
Aleman-Meza, Boanerges, et al., "Context-Aware Semantic Association Ranking", Technical Report 03-010, LSDIS Lab, Computer science, Univ. of Georgia, Aug. 21, 2003, pp. 1-18.
Baeza-Yates, Ricardo, et al., "Query Recommendation Using Query Logs in Search Engines", EDBT 2004 Workshops, LNCS 3268, vol. 3268/2005, Nov. 18, 2004, pp. 588-596.
Baseview Products, Inc., ClassManagerPro Administration Manual v. 1.0.5, Feb. 1, 1997.
Berger, Helmut, et al., "An Adaptive Information Retrieval System Based on Associative Networks", APCCM 2004, Dunedin, New Zealand, Jan. 2004, pp. 27-36.
Bradley, Keith, et al., "An Architecture for Case-Based Personalised Search", ECCBR 2004, LNAI 3155, Springer-Verlag, Berlin, Germany, Nov. 16, 2004, pp. 518-532.
Business Wire, "Global Network, Inc. Enters Into Agreement in Principle With Major Advertising Agency," Oct. 4, 1999.
Carmel, David, et al., "Juru at TREC 10—Experiments with Index Pruning", TREC 2001, Gaithersburg, MD, Nov. 2001, pp. 1-9.
Chang, Shi-Kuo, et al., "Adlet: An Active Document Abstraction for Multimedia Information Fusion", IEEE Transactions on Knowledge and Data Engineering, vol. 13, Issue 1, Jan./Feb. 2001, pp. 112-123.
Chekuri, Chandra, et al., "Web Search Using Automatic Classification", 6th World Wide Web Conf., © 1997, pp. 1-11.
Cui, Hang, et al., "Probabilistic Query Expansion Using Query Logs", WWW 2002, Honolulu, HI, May 7-11, 2002, pp. 325-332.
Decision for Indian Patent Application No. 1083/MUMNP/2007, dated Jul. 26, 2011.
Dedrick, R., A Consumption Model for Targeted Electronic Advertising, Intel Architecture Labs, IEEE, 1995.
Dedrick, R., Interactive Electronic Advertising, IEEE, 1994.

(56) References Cited

OTHER PUBLICATIONS

Examination Report for Indian Patent Application No. 1083/Mumnp/2007, dated Feb. 3, 2011.
Examiner 1s Report No. 2 for Australian Patent Application No. 2005323159, dated Nov. 26, 2009.
Examiner's Report No. 2 for Australian Patent Application No. 2005323159, dated Nov. 12, 2009.
Finkelstein, Lev, et al., "Placing Search in Context: The Concept Revisited", ACM Transactions on Information Systems, vol. 20, Issue 1, Jan. 2002, pp. 116-131.
First Examination Report for Indian Patent Application No. 1083/MUMNP/2007, dated Feb. 9, 2010.
Glover, Eric J., et al., "Web Search—Your Way", Communications of the ACM, vol. 44, No. 12, Dec. 2001, pp. 97-102.
Gunduz, Sule, et al., "A Web Page Prediction Model Based on Click-Stream Tree Representation of User Behavior", SIGKDD '03, Washington, DC, Aug. 24-27, 2003, pp. 535-540.
Harrgittai, E., "Classifying and Coding Online Actions," Social Science Computer Review, vol. 22, No. 2, pp. 210-227 (2004).
Haveliwala, Taher H., "Topic-Sensitive PageRank", WWW 2002, Honolulu, HI, May 7-11, 2002, pp. 1-10.
Haveliwala, Taher H., "Topic-Sensitive PageRank: A Context-Sensitive Ranking Algorithm for Web Search", IEEE Transactions on Knowledge and Data Engineering, vol. 15, No. 4, Jul./Aug. 2003, pp. 784-796.
Hearing Notice for Indian Patent Application No. 1083/MUMNP/2007, dated Mar. 7, 2011.
Huynh, Thanh N., et al., "Metadata for Object-Relational Data Warehouse", DMDW 2000, Stockholm, Sweden, Jun. 5-6, 2000, pp. 3-1 to 3-9.
International Search Report and the Written Opinion on PCT/US2005/046194, dated Dec. 15, 2006.
Kim, Jin-Gang, et al., "Intelligent Information Recommend System on the Internet", Proceedings of the 1999 International Workshops on Parallel Processing, Sep. 21-24, 1999, pp. 376-380.
Lawrence, Steve, et al., "Context Page Analysis for Improved Web Search", IEEE Internet Computing, Jul./Aug. 1998, pp. 38-46.
Liu, Fang, et al., "Personalized Web Search by Mapping User Queries to Categories", CIKM '02, Mclean, VA, Nov. 4-9, 2002, pp. 558-565.
Liu, Fang, et al., "Personalized Web Search for Improving Retrieval Effectiveness", IEEE Transactions on Knowledge and Data Engineering, vol. 16, No. 1, Jan. 2004, pp. 28-40.
Liu, Rey-Long, et al., "Mining for Interactive Identification of Users' information Needs", Information Systems, vol. 28, Issue 7, Oct. 2003, pp. 815-833.
Mayfield, James, et al., "Single N-gram Stemming", SIGIR '03, Jul. 28-Aug. 1, 2003, Toronto, Canada, pp. 415-416.
Mobasher, Bamshad, et al., "Integrating Web Usage and Content Mining for More Effective Personalization", E-commerce and Web Technologies, LNCS 1875, Springer-Verlag, Berlin, Germany, © 2000, pp. 1-12.
Ng, Vincent, et al., "An Intelligent Agent for Web Advertisements", CODAS, Beijing, China, Apr. 23-24, 2001, pp. 102-109.
Office Action for Canadian Patent Application No. 2,592,741, dated Nov. 23, 2010.
Request for Reexamination of U.S. Pat. No. 6,446,045 B1, U.S. Appl. No. 95/001,061.
Request for Reexamination of U.S. Pat. No. 6,829,587 B2, U.S. Appl. No. 95/001,068.
Request for Reexamination of U.S. Pat. No. 7,240,025 B2, U.S. Appl. No. 95/001,073.
Request for Reexamination of U.S. Pat. No. 7,249,059 B2, U.S. Appl. No. 95/001,069.
Scime, Anthony, et al., "WebSifter: An Ontology-based Personalizable Search Agent for the Web", DLRP 2000, Kyoto, Japan, Nov. 13-16, 200, pp. 203-210.
Shen, Xuehua, et al., "Exploiting Query History for Document Ranking in Interactive Information Retrieval", SIGIR'03, Toronto, Canada, Jul. 28-Aug. 1, 2003, pp. 377-378.
Sheth, Beerud, et al., "Evolving Agents for Personalized Information Filtering", CAIA, Orlando, FL, © 1993, pp. 345-352.
Shinkai, Daiki, et al., "Complement Keywords for Query Toward Efficient Information Retrieval", IEEE Doc. No. 0-7803-5731-0199, © 1999, pp. 916-921.
Sieg, Ahu, et al., "Inferring User's Information Context: Integrating User Profiles and Concept Hierarchies", Proc. of the 2004 Meeting of the International Federation of Classification Societies, IFCS 2004, Chicago, IL, Jul. 2004, pp. 563-574.
Statement of Grounds and Particulars in Support of Opposition for Australian Patent Application No. 2005323159, dated Feb. 7, 2011.
Statement Regarding References in 1449 Form.
Supplementary European Search Report for European Patent Application No. 05854841.3, dated Nov. 17, 2009.
Wang, Jenq-Haur, et al., "Generating ConceptHierarchies From Text for Intelligence Analysis", Lecture Notes in Computer Science, Springer-Verlag, Berlin, Aug. 24, 2004, pp. 100-113.
Widyantoro, Dwi H., et al., "An Adaptive Algorithm for Learning Changes in User Interests", CIKM '99, Kansas City, MO, Nov. 1999, pp. 405-412.
Williams, et al., Query Association for Effective Retrieval, 1 Proceedings of the Eleventh International Conference on Information and Knowledge Management, pp. 324-331 (2002), 10 pgs.
Xue, Gui-Rong, et al., "Implicit Link Analysis for Small Web Search", SIGIR '03, Jul. 28-Aug. 1, 2003, Toronto, Canada, pp. 56-63.
Xue, Gui-Rong, et al., "Optimizing Web Search Using Web Click-Through Data", CIKM '04, Washington, DC, Nov. 8-13, 2004, pp. 118-126.
Zeff, R. et al., Advertising on the Internet, 2nd Ed., John Wiley & Sons, 1999.
Office Action on U.S. Appl. No. 11/026,497 dated Nov. 14, 2006.
Office Action on U.S. Appl. No. 11/026,497 dated Dec. 24, 2008.
Office Action on U.S. Appl. No. 11/026,497 dated Dec. 8, 2010.
Office Action on U.S. Appl. No. 11/026,497 dated Jun. 22, 2010.
Office Action on U.S. Appl. No. 11/026,497 dated Aug. 13, 2007.
Office Action on U.S. Appl. No. 11/026,497 dated Sep. 14, 2011.
Office Action on U.S. Appl. No. 11/026,497 dated Sep. 28, 2009.
Mack, Robert, et al., "Knowledge Portals and the Emerging Digital Knowledge Workplace", IBM Systems Journal, vol. 40, No. 4, © 2001, pp. 925-955.
Marwick, Alan D., et al., "Knowledge Management Technology", IBM Systems Journal, vol. 40, No. 4, © 2001, pp. 814-830.
Information Access Technologies, Inc., Aaddzz brochure, "The Best Way to Buy and Sell Web Advertising Space," © 1997.
Information Access Technologies, Inc., Aaddzz.com website archive from www.Archive.org, archived on Jan. 30, 1998.
Baseview Products, Inc., AdManagerPro Administration Manual v. 2.0, Dec. 1998.
Brin, Sergey and Page, Lawrence. 1998. The anatomy of a large-scale hypertextual Web search engine. In Proceedings of the seventh international conference on World Wide Web 7 (WWW7), Philip H. Enslow, Jr. and Allen Ellis (Eds.). Elsevier Science Publishers B. V., Amsterdam, The Netherlands, The Netherlands, 107-117.
Chen, Hsinchun, et al., "Internet Browsing and Searching: User Evaluations of Category Map and Concept Space Techniques", Journal of the American Society for Information Science, vol. 49, No. 7, May 15, 1998, pp. 582-603.

\* cited by examiner

ASSOCIATING FEATURES WITH ENTITIES, SUCH AS CATEGORIES OF WEB PAGE DOCUMENTS, AND/OR WEIGHTING SUCH FEATURES

CROSS-REFERENCE TO RELATED PATENT APPLICATIONS

This application is a continuation of, and claims priority to, U.S. patent application Ser. No. 11/026,497, titled "ASSOCIATING FEATURES WITH ENTITIES, SUCH AS CATEGORIES OF WEB PAGE DOCUMENTS, AND/OR WEIGHTING SUCH FEATURES" and filed Dec. 30, 2004, the entirety of which is herein incorporated by reference.

§ 1. BACKGROUND OF THE INVENTION

§ 1.1 Field of the Invention

The present invention concerns advertising. In particular, the present invention concerns improving targeted advertising.

§ 1.2 Background

Interactive advertising provides opportunities for advertisers to target their ads to a receptive audience. That is, targeted ads are more likely to be useful to end users since the ads may be relevant to a need inferred from some user activity (e.g., relevant to a user's search query to a search engine, relevant to content in a document requested by the user, etc.). Query keyword relevant advertising has been used by search engines. The AdWords advertising system by Google of Mountain View, Calif. is one example of query keyword relevant advertising. Similarly, content-relevant advertising systems, such as the AdSense advertising system by Google for example, have been used. For example, U.S. patent application Ser. No. 10/314,427 (incorporated herein by reference and referred to as "the '427 application") titled "METHODS AND APPARATUS FOR SERVING RELEVANT ADVERTISEMENTS", filed on Dec. 6, 2002 and listing Jeffrey A. Dean, Georges R. Harik and Paul Bucheit as inventors, and Ser. No. 10/375,900 (incorporated by reference and referred to as "the '900 application") titled "SERVING ADVERTISEMENTS BASED ON CONTENT," filed on Feb. 26, 2003 and listing Darrell Anderson, Paul Bucheit, Alex Carobus, Claire Cui, Jeffrey A. Dean, Georges R. Harik, Deepak Jindal and Narayanan Shivakumar as inventors, describe methods and apparatus for serving ads relevant to the content of a document, such as a Web page for example.

When ads are to be served using some measure of their relevance to document, relevance information about the document is needed. Such relevance information may be determined from information intrinsic to the document, such as content extracted from the document. For example, concepts or topics may be determined using the content of the document. The document may also be assigned to one or more clusters. (See, e.g., U.S. Provisional Application Ser. No. 60/416,144 (incorporated herein by reference), titled "METHODS AND APPARATUS FOR PROBALISTIC HIERARCHICAL INFERENTIAL LEARNER," filed on Oct. 3, 2003 In another example, feature vectors may be used to represent the occurrence of words and/or phrases in the document. Although such techniques for determining relevance information for documents have worked well, it is desirable to be able to provide additional relevance information, and/or to refine the relevance information to make it more useful.

Further if ads are to be associated with categories (e.g., for targeting to document categories, for association with categorical listings, etc.) it would be useful to develop and/or test such associations. Similarly, if query terms are to be associated with categories (e.g., for generating a categorized result page in response to a search query), it would be useful to develop and/or test such associations.

In view of the foregoing, it would be useful to expand and/or refine document and/or category relevance information. More generally, it would be useful to associate features with entities, such as documents, categories, etc. It would also be useful to score (e.g., weight) such associations.

§ 2. SUMMARY OF THE INVENTION

Embodiments consistent with the present invention may be used to determine features that may be used to represent relevance information (e.g., properties, characteristics, etc.) of an entity, such as a document or category for example. Such features may be determined and associated with the entity by accepting an identifier that identifies the entity, obtaining search query information related to the entity using the entity identifier, determining features using the obtained query information, and associating the features determined with the entity. In at least some embodiments consistent with the present invention, such features may be determined for an entity using query information, and/or perhaps user action information. In at least some embodiments consistent with the present invention, in addition to, or instead of, query information, other serving parameter information may be used to determine and/or weight features.

In at least some embodiments consistent with the present invention, weights of such features may be similarly determined. The weights may be determined using scores. In the context of document entities, the scores may be a function of one or more of (i) whether the document was selected, (ii) a user dwell time on a selected document, (iii) whether or not a conversion occurred with respect to the document, (iv) a frequency of queries including the feature, etc.

In at least some embodiments consistent with the present invention, the document is a Web page. In at least some embodiments consistent with the present invention, the features are n-grams.

In at least some embodiments consistent with the present invention, the relevance information of the document may be used to target the serving of advertisements with the document. In at least some other embodiments consistent with the present invention, the features of a category may be used to associate query terms and categories, and/or ads and categories.

In at least some embodiments consistent with the present invention, a score (e.g., a weight) associated with the feature-to-entity association may be updated by (i) using the feature-to-entity association to generate one or more results for presentation to a user, (ii) tracking user behavior with respect to the results, and (ii) updating the score associated with the feature-to-entity association using the tracked user behavior.

§ 3. BRIEF DESCRIPTION OF THE DRAWINGS

§ 4. DETAILED DESCRIPTION

Figure 1:
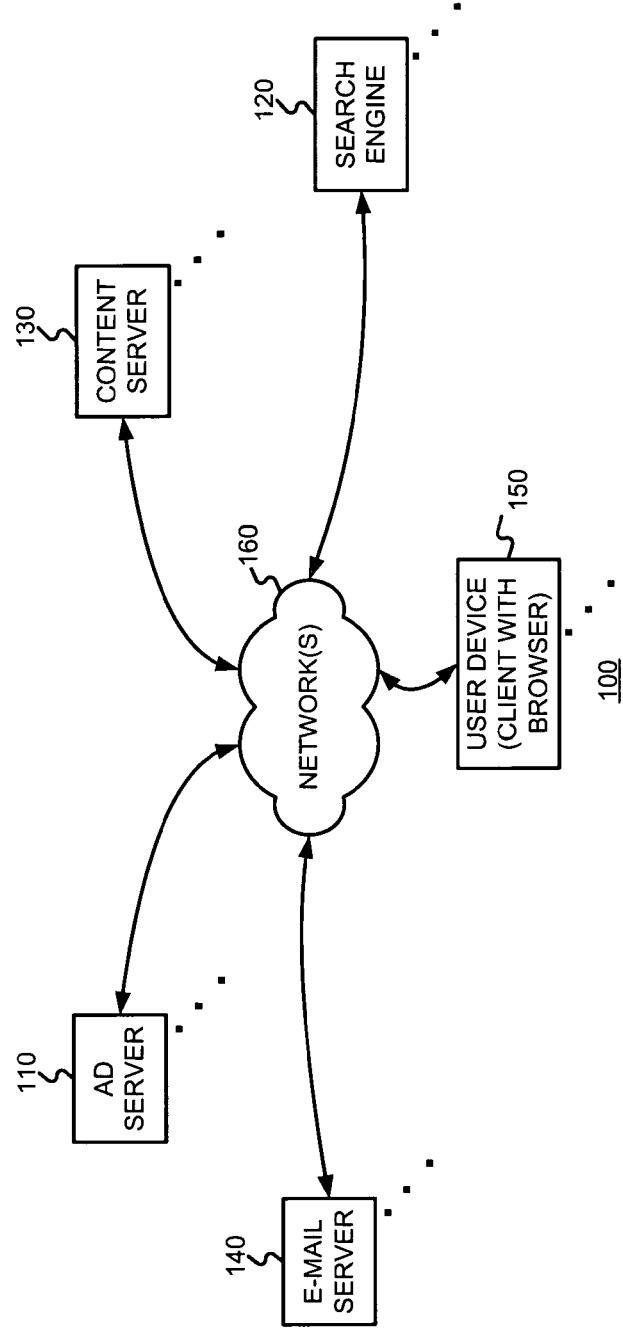
FIG. 1 is a block diagram illustrating an exemplary on-line advertising environment in which, or with which, the present invention may be used.

The present invention may involve novel methods, apparatus, message formats, and/or data structures for associating one or more features with an entity, such as a Web page document, or category for example, and/or applying and/or adjusting a score or weight to at least one of such features. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

In the following, definitions of terms that may be used in the specification are provided in § 4.1. Then, environments in which, or with which, the present invention may operate are described in § 4.2. Thereafter, exemplary embodiments consistent with the present invention are described in § 4.3. An example illustrating an operation in an exemplary embodiment consistent with the present invention is provided in § 4.4. Finally, some conclusions regarding the present invention are set forth in § 4.5.

§ 4.1 Definitions

Online ads may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a document on which, or with which, the ad was served, a search query or search results associated with the serving of the ad, a user characteristic (e.g., their geographic location, the language used by the user, the type of browser used, previous page views, previous behavior), a host or affiliate site (e.g., America Online, Google, Yahoo) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain location, etc. As another example, in some systems, an advertiser may specify that its ad is to be served only if a page or search query includes certain keywords or phrases. As yet another example, in some systems, an advertiser may specify that its ad is to be served only if a document being served includes certain topics or concepts, or falls under a particular cluster or clusters, or some other classification or classifications.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

The ratio of the number of selections (e.g., clickthroughs) of an ad to the number of impressions of the ad (i.e., the number of times an ad is rendered) is defined as the "selection rate" (or "clickthrough rate") of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's Website, and consummates a purchase there before leaving that Website. Alternatively, a conversion may be defined as a user being shown an ad, and making a purchase on the advertiser's Website within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Often, if user actions don't indicate a consummated purchase, they may indicate a sales lead, although user actions constituting a conversion are not limited to this. Indeed, many other definitions of what constitutes a conversion are possible.

The ratio of the number of conversions to the number of impressions of the ad (i.e., the number of times an ad is rendered) is referred to as the "conversion rate." If a conversion is defined to be able to occur within a predetermined time since the serving of an ad, one possible definition of the conversion rate might only consider ads that have been served more than the predetermined time in the past.

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.). Ad spots in the document may be defined by embedded information or instructions. In the context of the Internet, a common document is a Web page. Web pages often include content and may include embedded information (such as meta information, hyperlinks, etc.) and/or embedded instructions (such as JavaScript, etc.). In many cases, a document has a unique, addressable, storage location and can therefore be uniquely identified by this addressable location. A universal resource locator (URL) is a unique address used to access information on the Internet.

"Document information" may include any information included in the document, information derivable from information included in the document (referred to as "document derived information"), and/or information related to the document (referred to as "document related information"), as well as an extension of such information (e.g., information derived from related information). An example of document derived information is a classification based on textual content of a document. Examples of document related information include document information from other document(s) with links to the instant document, as well as document information from other document(s) to which the instant document links and document information from other document(s) related to the instant document.

Content from a document may be rendered on a "content rendering application or device". Examples of content rendering applications or devices include an Internet browser (e.g., Explorer or Netscape), a media player (e.g., an MP3 player, a Realnetworks streaming audio file player, etc.), a viewer (e.g., an Adobe Acrobat pdf reader), etc.

A "content owner" is a person or entity that has some property right in the content of a document. A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary.

"User information" may include user behavior information and/or user profile information.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

§ 4.2. Environments in Which, or With Which, the Present Invention may Operate

FIG. 1 illustrates an exemplary environment 100 in which, or with which, the present invention may be used. A user device (also referred to as a "client" or "client device") 150 may include a browser facility (such as the Explorer browser from Microsoft, the Opera Web Browser from Opera Software of Norway, the Navigator browser from AOL/Time Warner, etc.), an e-mail facility (e.g., Outlook from Microsoft), or any other software application or hardware device used to render content. A search engine 120 may permit user devices 150 to search collections of documents (e.g., Web pages). A content server 130 may permit user devices 150 to access (e.g., for rendering) documents. An e-mail server (such as Hotmail from Microsoft Network, Yahoo Mail, GMail from Google, etc.) 140 may be used to provide e-mail functionality to user devices 150. An ad server 110 may be used to serve ads to user devices 150. The ads may be served in association with search results provided by the search engine 120. Content-relevant ads may be served in association with content provided by the content server 130, and/or e-mail supported by the e-mail server 140 and/or user device 150 e-mail facilities. Thus, the ad server 110 may be a content-relevant ad server, such as those described in the '427 and '900 applications introduced above.

As discussed in the '900 application (introduced above), ads may be targeted to documents served by content servers. Thus, a content server 130 that receives requests for documents (e.g., articles, discussion threads, music, video, graphics, search results, Web page listings, etc.), and retrieves the requested document in response to, or otherwise services, the request may consume ads. The content server 130 may submit a request for ads to the ad server 110. Alternatively, or in addition, a user device 150 may submit such a request. Alternatively, or in addition, a Web-based e-mail server 140 may submit such a request. Such an ad request may include a number of ads desired. The ad request may also include document request information. This information may include the document itself (e.g., a Web page), a category or topic corresponding to the content of the document or the document request (e.g., arts, business, computers, arts-movies, arts-music, etc.), part or all of the document request, content age, content type (e.g., text, graphics, video, audio, mixed media, etc.), geolocation information, end user local time information, document information (such as document features for example), etc.

The content server 130, Web-based e-mail server 140, and/or user device 150 may combine the requested document with one or more of the advertisements provided by the ad server 110. This combined information including the document content and advertisement(s) is then forwarded towards, and/or rendered on, the end user device 150 that requested the document, for presentation to the user. Alternatively, or in addition, the ad(s) may be combined with, or rendered with, the requested document in some other way (e.g., by the client device). Finally, the content server 130 or Web-based e-mail server 140 may transmit information about the ads and how, when, and/or where the ads are to be rendered (e.g., position, clickthrough or not, impression time, impression date, size, conversion or not, etc.) back to the ad server 110. Alternatively, or in addition, such information may be provided back to the ad server 110 by some other means. Consistent with the present invention, the ad server 110 may store ad performance information.

A search engine 120 may receive queries for search results and may consume ads. In response, the search engine may retrieve relevant search results (e.g., from an index of Web pages). An exemplary search engine is described in the article S. Brin and L. Page, "The Anatomy of a Large-Scale Hypertextual Search Engine," Seventh International World Wide Web Conference, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine 120 may submit a request for ads to the ad server 110. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as end user local time information, geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, topics of identified documents, feature vectors of identified documents, etc.

The search engine 120 may combine the search results with one or more of the advertisements provided by the ad server 110. Alternatively, or in addition, the ad(s) may be combined with, or rendered with, the requested document in some other way (e.g., by the client device). This combined information including the search results and advertisement(s) is then forwarded towards the user that submitted the search, for presentation to the user. Preferably, the search results are maintained as distinct from the ads, so as not to confuse the user between paid advertisements and presumably neutral search results.

Finally, the search engine 120 may transmit information about the ad and when (e.g., end user local time), where (e.g., geolocation), and/or how the ad was to be rendered (e.g., position, click-through or not, impression time, impression date, size, conversion or not, etc.) back to the ad server 110. Alternatively, or in addition, such information may be provided back to the ad server 110 by some other means. Consistent with the present invention, the search engine 120 may also associate search query information (and/or other serving parameter information) with the documents associated with search results, documents associated with ads, and/or ads. The search engine 120 may also associate the search query information with user actions (e.g., selections, dwell time, etc.) with respect to the documents linked from the search result pages, and/or user actions (e.g., selections, conversions, etc.) with respect to the ads rendered with the search results pages.

The Web-based e-mail server 140 may be thought of, generally, as a content server in which a document served is simply an e-mail. Further, e-mail applications (such as Microsoft Outlook for example) may be used to send and/or receive e-mail. Therefore, a Web-based e-mail server 140 or a client device 150 application may be thought of as an ad consumer. Thus, e-mails may be thought of as documents, and targeted ads may be served in association with such documents. For example, one or more ads may be served in, under, over, or otherwise in association with an e-mail.

The various servers may exchange information via one or more networks 160, such as the Internet for example.

§ 4.3. Exemplary Embodiments

§ 4.3.1 Overview

The present invention permits features, such as keywords or topics, to be associated with entities, such as Web pages or categories. (Generally, entities (or representatives of entities) can be put on a result page, and can be acted on by users.) Such associations may be used for a variety of reasons, such as, for example, targeting ads, suggesting targeting features for an advertisement for presentation to advertisers, automatically generating targeting criteria for an advertisement, etc. In some embodiments consistent with the present invention, features are associated with entities using search engine query logs, search engine referrals, and/or other user actions with respect to documents associated with a search results page. Methods and apparatus consistent with the present invention can improve the effectiveness of marketing campaigns, and can reduce the amount of work (and cost) in running a campaign.

Figure 2:
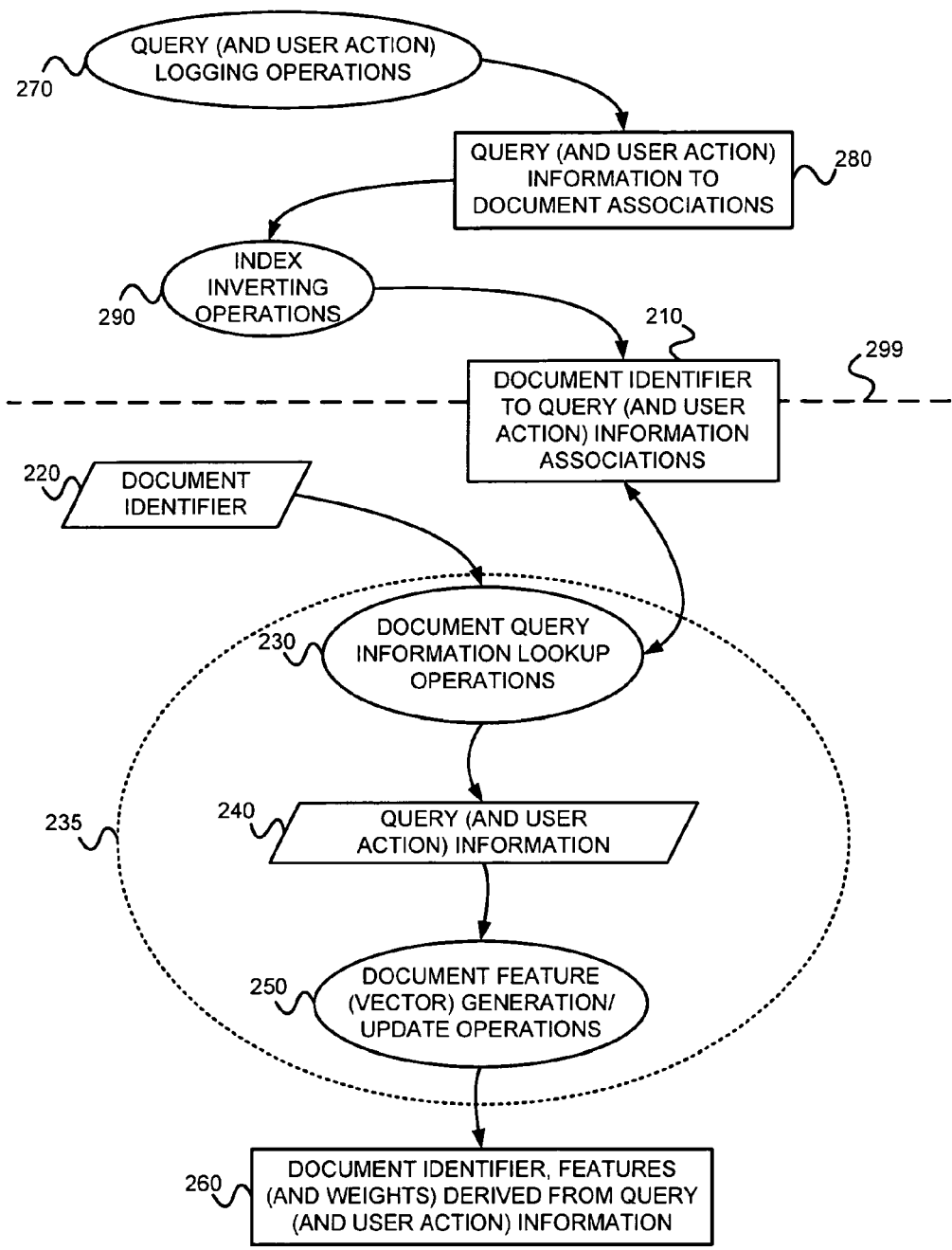
FIG. 2 is a bubble diagram illustrating operations that may be performed, and information that may be generated, used, and/or stored, by a document feature generation and/or update system consistent with the present invention.

FIG. 2 is a bubble diagram illustrating operations 235 that may be performed, and information that may be generated, used, and/or stored, by a document feature generation and/or update system consistent with the present invention, as well as operations for generating information used by such operations 235. As shown, operations 235 may accept a document identifier (such as, for example, a URL if the document is a Web page) 220, use the document identifier 220 to obtain query (and/or user action) information 210 associated with the document, and generate and/or update features (and perhaps weights) for the document 260 using the obtained query (and/or user action) information. More specifically, document query information lookup operations 230 may use the document identifier 220 to lookup query (and/or user action) information 240 pertaining to the identified document 220 from stored information 210. Document feature (vector) generation/update operations 250 may then use this query (and/or user action) information 240 to generate features (and perhaps weights) 260 associated with the identified document.

In the foregoing example, it was assumed that the document identifier to query (and/or user action) information association information 210 was available. This information may have been generated by the operations illustrated above the dashed line 299. For example, query (and/or user action)

logging operations 270 may be used to generate an aggregated log of query to document associations, and perhaps user action (including inaction) to document associations 280. Index inverting operations 290 may be used to generate the document identifier to query (and/or user action) information associations 210 from the aggregated log of query to document associations, and perhaps user action (including inaction) to document associations 280.

Figure 3:
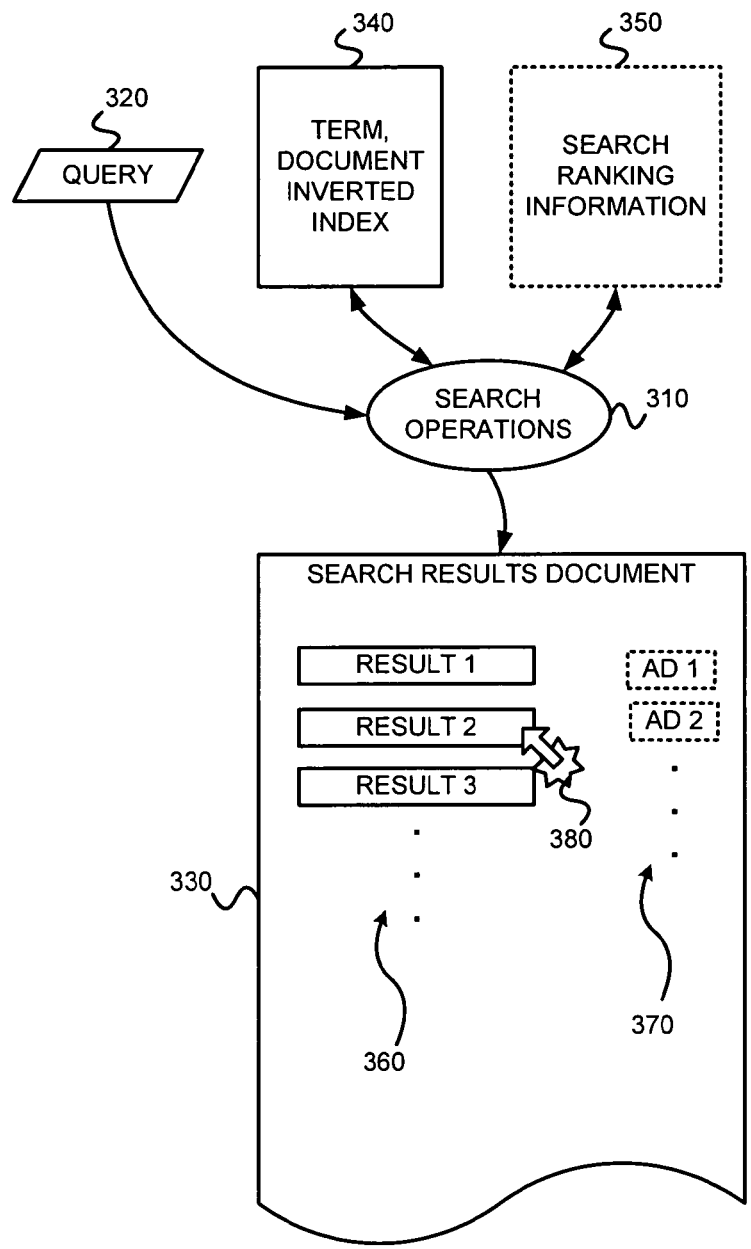
FIG. 3 is a bubble chart illustrating operations that may be used with search operations to associate query terms and selections with documents in a manner consistent with the present invention.

FIG. 3 is a bubble chart illustrating operations that may be used with search operations to associate query terms and selections with documents in a manner consistent with the present invention. In response to a search query 320, search operations 310 use term to document inverted index information 340 and perhaps search ranking information 350 to generate a search results document 330. The document 330 may include one or more search results 360. The document 330 may also include one or more ads 370. The search results 360 and/or ads 370 may be selected as indicated by cursor click 380. Referring back to FIG. 2, query (and/or user action) logging operations 270 may be used to log associations between query information 320 and document identifiers (such as URLs or ad identifiers for example) corresponding to the search results 360 and/or ads 370. These operations 270 may also be used to log associations between user actions (e.g., selections, conversions, dwell time, etc.) and document identifiers (such as URLs or ad identifiers for example) corresponding to the search results 360 and/or ads 370.

Figure 4:
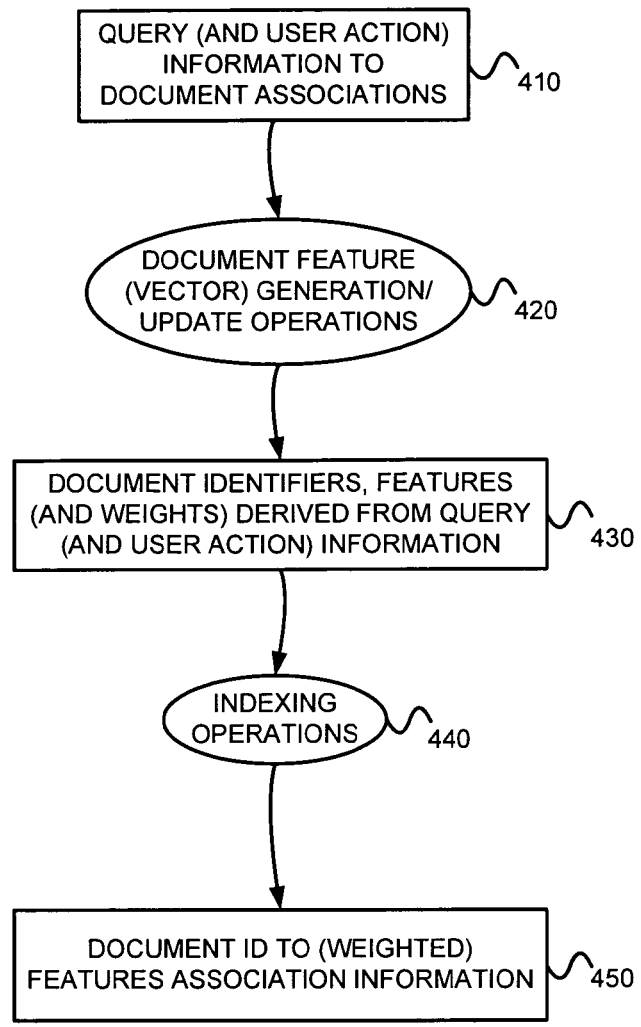
FIG. 4 is a bubble diagram illustrating operations that may be performed, and information that may be generated, used, and/or stored, by a document feature generation and/or update system consistent with the present invention.

Although performance is improved when an index is used, such an index is not required. For example, features (and perhaps weights) for a document may be derived directly from query (and perhaps user actions) associated with the document. FIG. 4 is a bubble diagram illustrating operations that may be performed, and information that may be generated and/or stored, by document feature generation and/or update system consistent with the present invention. Document feature generation/update operations 420 may use query (and perhaps user action) information to document associations 410 to generate or update features (and perhaps weights) associated with document identifiers 430. Although not necessary, indexing operations 440 may use this information 430 to generate an index of document identifiers to (weighted) features association information 450.

§ 4.3.2 Exemplary Methods

Figure 5:
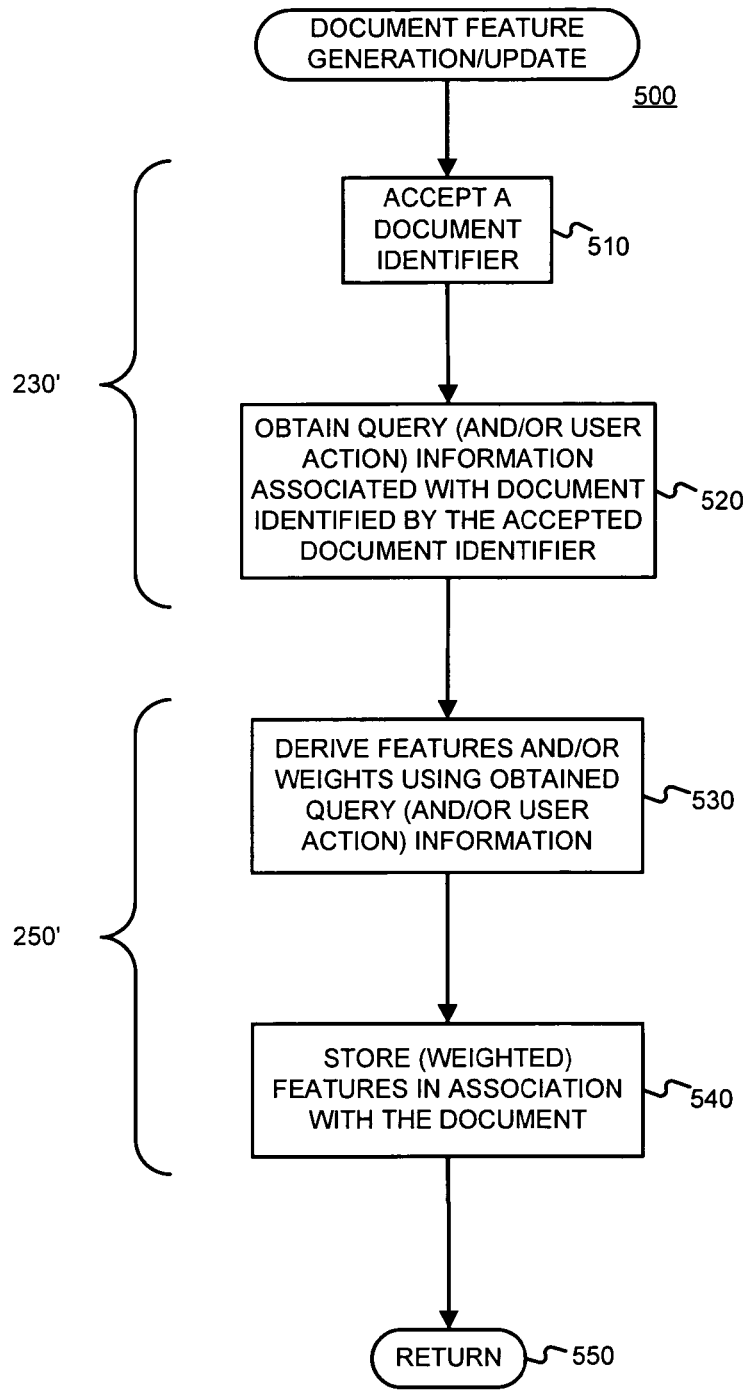
FIG. 5 is a flow diagram of an exemplary method that may be used to generate and/or update document feature information in a manner consistent with the present invention.

FIG. 5 is a flow diagram of an exemplary method 500 that may be used to generate and/or update document feature information in a manner consistent with the present invention. A document identifier (e.g., a URL of a Web page) is accepted (Block 510) and query information (and/or user action information) associated with the identified document is obtained (Block 520). As indicated by bracket 230', blocks 510 and 520 exemplify a method, consistent with the present invention, which may be used to perform the document query information lookup operations 230 of FIG. 2. Then, features and/or weights are generated using the obtained query information (and/or user action information) (Block 530), and the features, perhaps weighted features, are stored in association with the document (Block 540) before the method 500 is left (Node 550). As indicated by bracket 250', blocks 530 and 540 exemplify a method, consistent with the present invention, which may be used to perform the document feature generation/update operations 250 of FIG. 2.

Figure 6:
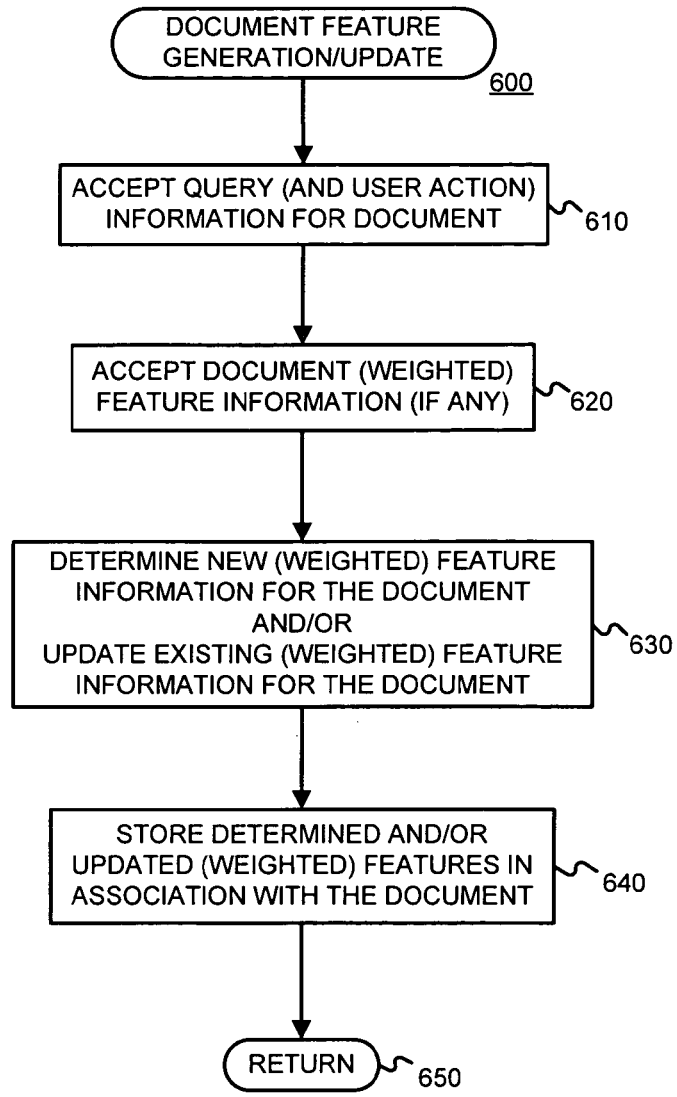
FIG. 6 is a flow diagram of an exemplary method that may be used to generate and/or update document feature information in a manner consistent with the present invention.

FIG. 6 is a flow diagram of an exemplary method 600 that may be used to generate and/or update document feature information in a manner consistent with the present invention. Query (and perhaps user action) information for a document is accepted. (Block 610) If any (weighted) feature information already exists for the document, it may be accepted. (Block 620) For example, the method 600 may be used to update already existing document (weighted) feature information. New (weighted) feature information is then determined for the document, or existing (weighted) feature information for the document is updated. (Block 630) The determined and/or updated (weighted) features are then stored in association with the document (Block 640) before the method 600 is left (Node 650).

In one embodiment consistent with the present invention, the features may be unigrams and n-grams, the document may be a Web page and the document identifier may be a URL of the Web page. Alternatively, or in addition, the features may be keywords, such as keywords used for targeting ads for example. Alternatively, or in addition, the features may be concepts, such as concepts used for targeting ads for example. The features may have associated weights in which higher weights indicate features more closely associated with the Web page. Thus, the Web page may have an associated weighted feature vector generated and/or updated by embodiments consistent with the present invention.

Methods consistent with the present invention, such as the methods 500 and 600 may be performed for a number of Web pages. Thus, the methods 500 and 600 may be performed for each URL u in plurality of URLs. In an exemplary embodiment, a plurality of queries Q are retrieved from a plurality of logged queries that returned the URL in a list of search results. (Note that if the document is an ad, or a Web page linked from an ad, the plurality of queries Q may be retrieved from a plurality of logged queries that returned the ad in a set of one or more ads rendered with on the search results page. Features from the queries may be used to populate (and/or update weights of) a feature vector associated with the URL. In one embodiment, only information from queries under which a URL selection occurred is used to populate (and/or update weights of) a feature vector associated with the URL. In yet another embodiment, information from all queries that returned the URL in a list of search results is used to populate (and/or update weights of) a feature vector associated with the URL, but a user action is used to weight the features. For example, information from a query that led to a selected URL may be weighted more than information from a query that led to a rendered URL that was not selected. Other user actions may also affect the feature weight. For example, the feature may be weighted more if a long dwell time occurred after selection than if a short dwell time occurred after selection. As another example, the feature may be weighed more if a conversion occurred after selection of a URL than if no conversion occurred after selection of a URL.

Different embodiments may select different features associated with the appropriate queries. For example, one embodiment consistent with the present invention may use all exact queries as associated features. As another example, another embodiment consistent with the present invention may use all n-grams from length I_1 to length I_2 as associated features (optionally with "stop" words and/or non-content words such as "the" removed). In many cases, there will be a set of features that "best" specify a document. If the features are scored and weighed such that the sum of the weights equals 1.00, one embodiment consistent with the present invention would be to take the features with the best weights until the sum of factors reaches some value (e.g., 0.80). In an alternative embodiment consistent with the present invention, features with weights less than a predetermined percent (e.g., 20%) of the weight of the best feature could be ignored. Still other embodiments consistent with the present invention may use some combination of the forgoing concepts (e.g., filtering features using absolute and/or relative weight or score thresholds) to obtain the "best" set features for a given document, or to filter out features without a strong affinity to the document.

The (e.g., weighted) features associated with a document may be used in a variety of ways. For example, the features may be used as document relevance information when determining a match (e.g., a similarity) to an ad in a content-relevant ad server such as the one described in the '900 patent application. As another example, the features may be used to provide or suggest keywords (e.g., used for an ad where the ad is the document, or wherein a landing page of the ad is the document).

§ 4.3.3 Exemplary Apparatus

Figure 7:
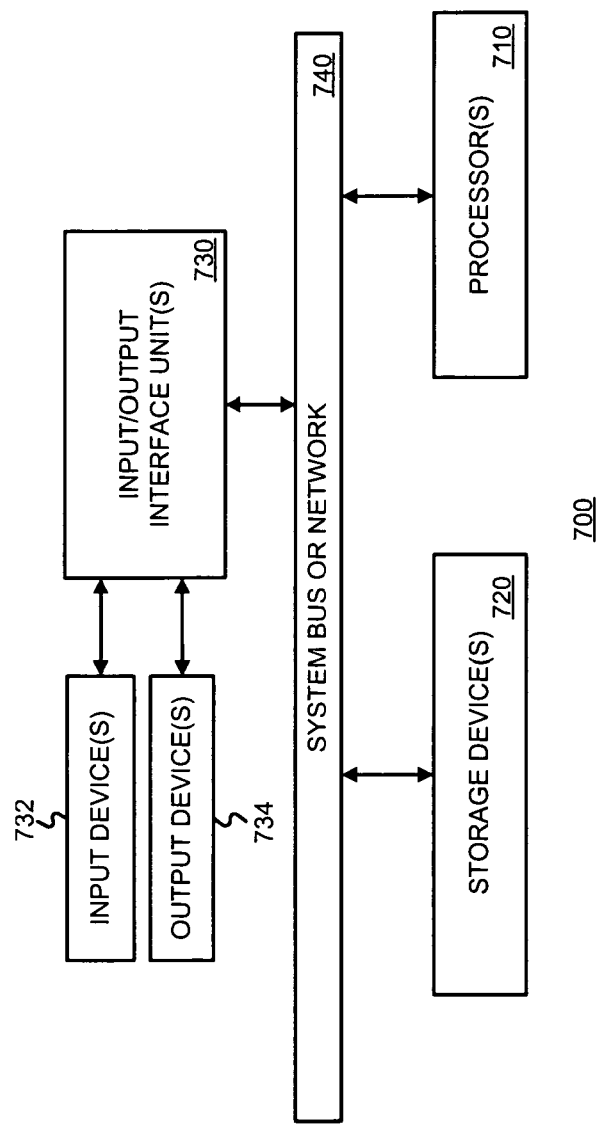
FIG. 7 is block diagram of a machine that may perform one or more operations and store information used and/or generated in a manner consistent with the present invention.

FIG. 7 is high-level block diagram of a machine 700 that may perform one or more of the operations discussed above. One or more such machines 700 may be used as a content-relevant ad server, a separate server, client devices, etc. The machine 700 basically includes one or more processors 710, one or more input/output interface units 730, one or more storage devices 720, and one or more system buses and/or networks 740 for facilitating the communication of information among the coupled elements. One or more input devices 732 and one or more output devices 734 may be coupled with the one or more input/output interfaces 730.

The one or more processors 710 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 720 and/or may be received from an external source via one or more input interface units 730.

In one embodiment, the machine 700 may be one or more conventional personal computers. In this case, the processing units 710 may be one or more microprocessors. The bus 740 may include a system bus. The storage devices 720 may include system memory, such as read only memory (ROM) and/or random access memory (RAM). The storage devices 720 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 732, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 710 through an appropriate interface 730 coupled to the system bus 740. The output devices 734 may include a monitor or other type of display device, which may also be connected to the system bus 740 via an appropriate interface. In addition to (or instead of) the monitor, the personal computer may include other (peripheral) output devices (not shown), such as speakers and printers for example.

Each of the ad server 110, the search engine 120, the content server 130, the e-mail server 140, and the user device 150, etc., may be embodied by one or more such machines 700.

§ 4.3.4 Refinements and Alternatives

Although the method 600 of FIG. 6 was described in the context of determining and/or updating (e.g., the weight of) unigram or n-gram to document associations, embodiments consistent with the present invention may be used to determine and/or update (the weight of) other feature-to-entity associations (e.g., keyword-to-category associations, category-to-ad associations, etc.). First, a feature-to-entity association is accepted or generated. Then, the association is used to generate (e.g., a document with) results. For example, keyword-to-category associations may be used to determine a Web page with selectable category listings in response to a query including the keyword. As another example, category-to-ad associations may be used to determine a Web page including one or more ads when a category is selected (or if the Web page has content that pertains to the category). User behavior with respect to the results (e.g., selection or not, conversion or not, dwell time, etc.) may be tracked. The tracked user behavior may then be used to update (e.g., the weight of, generally referred to as the "score" of) the feature-to-entity association.

Thus, suppose for example that three keyword-to-category associations were used to generate a Webpage with a three selectable category links. Suppose further that the user selected the first category link but quickly returned. Now suppose that the user selected the second category link and dwelled on the linked page. Finally, suppose that the user did not select the third category link. The keyword-to-first category association may be somewhat strengthened (e.g., due to the user selection), but not too much (e.g., due to the short dwell time and quick return), the keyword-to-second category association may be strengthened to a greater degree (e.g., due to the user selection and long dwell time), and the keyword-to-third category association may be weakened (e.g., due to the fact that the user did not select the third category link).

Refinements of, and alternatives to, the embodiments described above are possible. Each of the features may be given a score. The score may be used to determine a weight to assign to the feature, and/or to filter features. For example, a feature with a higher score may receive a higher weight, while a feature with a lower score may receive a lower weight. Weight should be a monotonic function of score, but need not be linear. The score may also be compared with a given (e.g., predetermined) threshold. If the score for the feature is below the threshold, the feature may be removed from association with the document, or it may be weighted to zero. The threshold may be absolute, and/or relative. For example, an absolute threshold might filter out a feature if its score did not exceed a predetermined value, while a relative threshold might filter out a feature that was not one of the top twenty features for the document.

The score may be a function of one or more of (a) a frequency of the feature with respect to the document, (b) a user action with respect to the document, (c) feature scores of related or similar documents, (d) total frequency and inverse document frequency of the feature, (e) general performance (e.g., selection rate, conversion rate, etc. across all queries) of the document, etc. Examples of each of these factors are described below.

Frequency

The feature score may be a function of the frequency of the feature (e.g., generated from query information). More frequent features may be given a higher score for example. The feature score may also be a function of the frequency of selections (e.g., clickthroughs) and/or queries for that term.

User Action

The feature score may be a function of a user action with respect to the document. For example, if the user selected the document when it was rendered on a search results page to a query, features from the query would be scored higher than if the document were not selected. As another example, if the user completed a transaction at a document when it was rendered on a search results page to a query, features from the query would be scored higher than if the no conversion took place on the document. Dwell time may also be considered. For example, if the user selects and dwells on the document for a long period of time when it was rendered on a search results page to a query, features from the query would be scored higher than if the document were selected but the user only dwelled on the document for short period of time. Indeed, a very short dwell time may be used to discount a score enhanced by the fact that a user selected the document.

Feature Scores of Related or Similar Documents

Since there may be few queries and/or user actions (e.g., selections, conversions, etc.) for some documents, it may be desirable to group documents together and treat them collectively, applying features and weights or scores across more than one document of the group. Documents may be grouped with other documents in various ways. For example, for Web page documents, it may be desirable to combine the analysis for multiple URLs on a Website, for URLs within a directory, URLs on similar topics, linked documents, etc. As a more specific example, all URLs on a Website may be grouped together, and all queries (and user actions) that lead to the Website are used to find features for Web pages of the entire Website. Similar pages may be computed using, for example, TF-IDF.

Consider URL u, a set of other URLs within the same directory of the Website S_1, a set of all URLs on the same Website S_2, and a set of all URLs with similar content S_3. Consider n-gram features T within queries that resulted in a clickthrough event to the URL u. A score S_t can be assigned for each term t in T, for example, as follows:

$$S\_t = w\_1 * f(S\_1) + w\_2 * f(S\_2) + w\_3 * f(S\_3) + w\_4 * f(u)$$

where f(S) is a function of the queries and user actions corresponding to URLs within set S. For example, as above, f(S) may factor in the number of occurrences of term t, user selections, and dwell times on the URL or site that the user clicked through to. Weights w_1 to w_4 allow the contribution of each set to vary.

Another improvement is possible by considering the probability of a user action (e.g., selection) for a URL for a term or query. In this case, the expected user action (e.g., selection) can be compared based on the position of a URL in the result list, with the actual user action (e.g., selection). Features may be weighted according to their user action (e.g., selection) rate, with features that result in user action rates above the average (expected) rate being given higher weights, and features that result in user action rates below the average (expected) given lower weights.

Levels of Tracking

The features and/or feature scores associated with a document may be tracked generally, over all users, or may be tracked per user group, or per individual user. That is, it may be desirable to segment the query and user action data for different types of users in order to create different sets of associated features that may subsequently be used with the different types of users. For example, information may be tracked and aggregated per user group (e.g., users within different demographics, users with similar interests, or individual users). For example, a separation by age groups may result in different features being the best associated features for a specific document. Similarly, if detailed information is available for the interests of a user, the associated features may be biased toward the interests of that user, for example by increasing the weight of features in the analysis above according to the weight of those features for the interests of the user.

Data Structures

Referring back to FIG. 2, different information associations 210 may be stored and/or accessed, depending on the particular embodiment used. For example, the information associations 210 may include one or more of (i) whether or not the document was selected, (ii) qualitative or quantitative dwell time information, (iii) query frequency, (iv) query parts, (v) document site information, (vi) document directory information, (vii) document group information, (viii) user information, etc.

Features

Instead of or in addition to, search query information corresponding to a document, other serving parameters, such as those listed in § 4.1 above for example, may be used to assign and/or weight features.

§ 4.4 Operational Example of an Exemplary Embodiment

Figure 8:
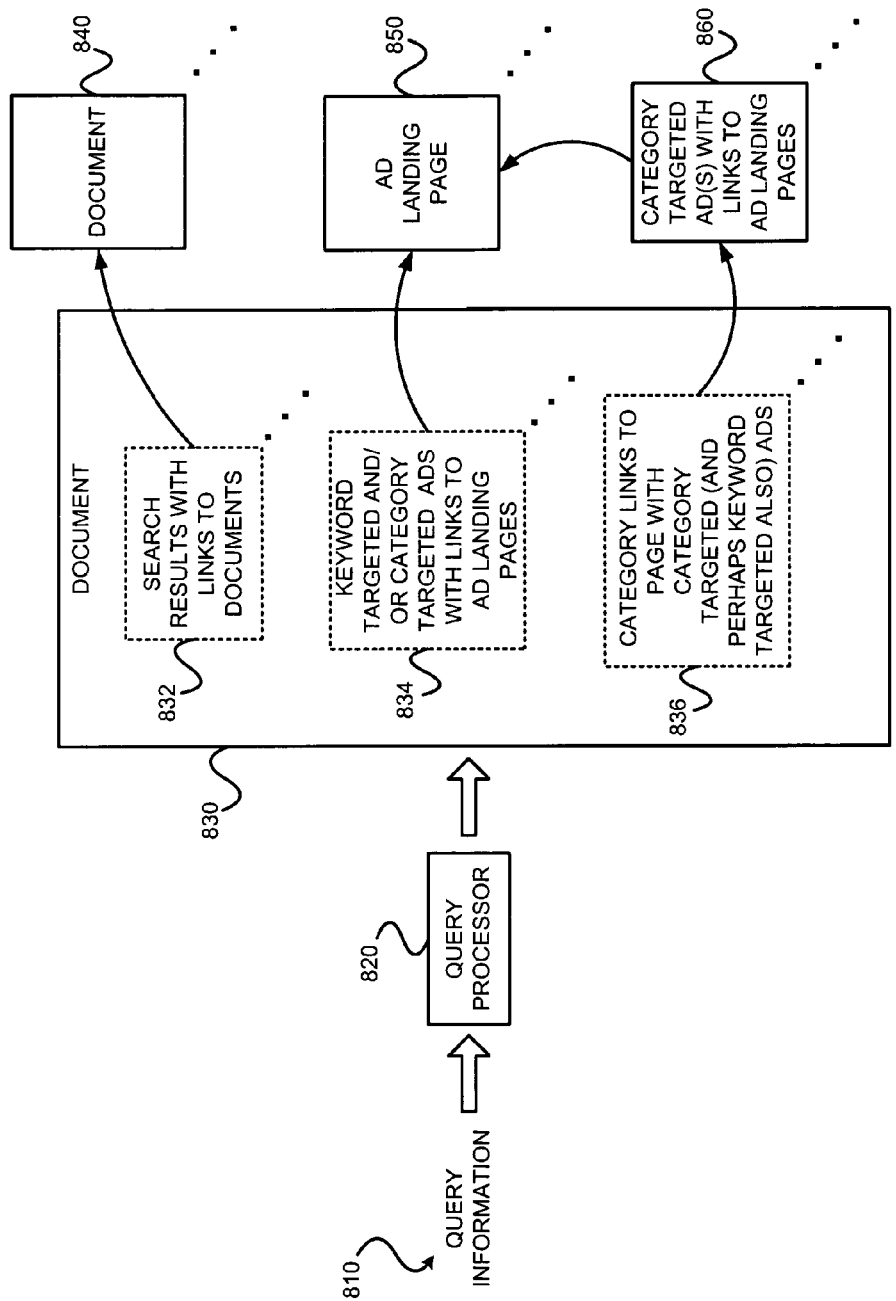
FIG. 8 is a diagram illustrating an example of how an exemplary embodiment consistent with present invention can make associations between categories and query terms and/or ads.

FIG. 8 is a diagram illustrating an example of how an exemplary embodiment consistent with the present invention can be used to associate features (such as terms, n-grams, etc.) with entities (such as categories). As shown, in this exemplary embodiment, a query processor 820 returns a document 830 in response to received query information 810. The query information 810 may include search query terms. The document may include one or more of (a) search results 832 including links to documents 840, (b) keyword targeted and/or category targeted ads 834 including links to ad landing pages 850, and (c) category links 836 to pages 860 including category targeted (which may also be keyword targeted) ads. The document 830 may include other links to other types of information as well.

Upon end user selection of one of the search result links 832, a corresponding document 840 is returned (e.g., loaded into a browser of an end user device). Upon end user selection of one of the ad links 834, a corresponding ad landing page 850 is returned. Finally, upon end user selection of one of the category links 836, a corresponding page including one or more category targeted ads 860 is returned. One or more ads with links to ad landing pages may also be provided, for example, below associated category headings or links. If the end user selects one of the ads on document 860, a corresponding ad landing page 850 is returned.

In at least some alternative embodiments consistent with the present invention, if an end user selects one of the category links 836, a "filtered" version of the document 830 may be rendered. In such a "filtered" version of the document 830, search results 832, keyword and/or category targeted ads 834, and/or category links 836 may be filtered such that they pertain to the selected category.

In the case where search results 832 are returned, embodiments consistent with the present invention may be used to associate query information 810 with the listed documents, and/or any selected document(s) 840. Such an association may reflect whether or not a document was selected.

In the case where keyword targeted and/or category targeted ads 834 are returned, embodiments consistent with the present invention may be used to associate query information 810 with listed ads, and/or any selected ad(s) 850. Such an association may reflect whether or not an ad was selected. Further, the present invention may be used to associate query information 810 with keywords and/or concepts used to target the serving of the ads 834. Such an association may reflect whether or not an ad was selected.

In the case where category links 836 are returned, embodiments consistent with the present invention may be used to associate query information 810 with listed categories and/or any selected category(ies). Such an association may reflect whether or not a category was selected. Alternatively, or in addition, such an association may reflect whether or not a category targeted ad on page 860 was selected. Further, the present invention may be used to associate query information 810 with keywords and/or concepts used to target the serving of the ads on page 860.

An embodiment in which the document 830 includes category links 836 to a page 860 with one or more category targeted ads may be used, for example, to provide "Yellow Pages" style classification to ads, such as local ads for example. As a more specific example, suppose that an ad serving system includes the category "plumbers," and one or more advertisers associate their ad campaigns with this "Yellow Page" category.

Suppose further that when an end user enters the query 810 "clogged drain," category links 836 include a "Local Plumbers" category link. (This keyword to category association may have been derived from the fact that one or more advertisers associated both the keyword target "clogged drain" and the category "Plumbers" with their ads. Alternatively, or in addition, a category may be inferred from a collection of words (e.g., extracted from ad information).)

If the end user then selects the "Local Plumbers" category link, they are provided with a page 860 containing one or more ads from local plumber advertisers. Embodiments consistent with the present invention may create an association, or reinforce an existing association, between the feature "clogged drain" and the entity "category=Plumbers."

Now suppose that an end user enters the query 810 "DIY clogged drain" and that a document 830 with category links 836 including the "Local Plumbers" category link is provided. However, suppose that the end user does not select the "Local Plumbers" category link because do-it-yourselfers won't usually hire a plumber. Suppose instead that the user selects a "Local Plumbing Supplies" category link 836. Lack of selections (or short dwell times) of the "Local Plumbers" category link indicates a negative correlation between the query information "DIY clogged drain" and the "Local Plumbers" category, while selections (or long dwell times) of the "Local Plumbing Supplies" category indicates an correlation between the query information "DIY clogged drain" and the "Local Plumbing Supplies" category.

In at least some embodiments consistent with the present invention, when the "Local Plumbers" category link 836 is selected, a page 860 with local plumber ads (which may also be targeted by keywords carried through from the terms of the search query 810) is provided. If the page 860 also includes ads having a strong association to a category (e.g., due to advertiser association), then a similar process, in which it is determined just how strong the association between the advertiser and the category is by observing action or inaction on that advertiser's link, may occur. That is, an ad-category association may be modified depending on a user action with respect to the ad when the category was used to target the serving of the ad(s) on the page 860 (and possibly modified by keywords carried through from the original query 810).

As such information is gathered and analyzed, a strong affinity between "clogged drain" and the "Yellow Pages" category "Plumbers" (as long as the term "diy" is not included) is learned.

The fact that some advertisers who indicate that they are "plumbers" (e.g., by associating their ad with the category plumbers) may have ads that aren't selected much (or dwelled on) may be learned. Using such information, an ad serving system may cease to provide such ads in a page 860 linked from the category link 836 "Local Plumbers". Alternatively, in an ad serving system in which ads are scored, the scores of such ads may be reduced.

Finally, for ads without an associated category (and even for ads with an associated category), if there is a strong association (e.g., correlation) between such ads and one or more categories, at least some embodiments consistent with the present invention may be used to recommend to advertisers that they associate their ad with such categories. For example, such an embodiment may recommend that an advertiser with an ad with the targeting keywords "clogged drain" and "emergency service" associate its ad with the category "Plumber". Alternatively, such an association may be generated automatically.

§ 4.5 Conclusions

As can be appreciated by the foregoing, embodiments consistent with the present invention may be used to assign and/or weight features, such as n-grams, to entities, such as documents or concepts. The assigned features may represent relevance of the document and may be used to target the serving of advertisements with the document.

What is claimed is:

1. A method comprising:
   accessing search queries that were previously submitted by users and a corresponding set of search results that were previously presented in search results pages for each of the search queries, each search result in the set of the search results including a link to a corresponding web page;
   identifying, for a given web page that was previously accessed through user interaction with links included in search results from the set of search results, a set of the search queries that were previously used to provide search results pages that included the links with which the user interactions occurred to access the given web page;
   determining, for each given search query in the set of search queries, a feature score based on a user dwell time at the given web page following user interaction with the links to the given web page that were provided in the search results pages for the given search query, including assigning a higher scores for higher dwell times at the given web page;
   storing, based on the determined features scores, one or more of the search queries from the identified set of search queries as keywords for the given web page, including storing the given query having a best feature score as a given keyword for the given web page;
receiving a request for content to be displayed with the given web page;
selecting content for display with the given web page based on the given keyword for the given web page matching terms used to distribute the content; and
transmitting, via a network, the selected content for display with the given web page responsive to the request for content.

2. The method of claim 1, wherein at least one search query in the set of search queries comprises one or more n-grams.

3. The method of claim 2, comprising determining a weight for each n-gram based on a number of times links to the given web page are selected when the n-gram is included in the at least one search query that was used to present a search results page that includes the links to the given web page.

4. The method of claim 3, wherein determining the weight comprises determining the weight for each n-gram based, at least in part, on a number of conversions that occur after selections of the link for the given web page.

5. The method of claim 3, comprising filtering one or more n-grams from the search queries based on the weight associated with the n-gram being below a predetermined value.

6. A system comprising:
accessing search queries that were previously submitted by users and a corresponding set of search results that were previously presented in search results pages for each of the search queries, each search result in the set of the search results including a link to a corresponding web page;
identifying, for a given web page that was previously accessed through user interaction with links included in search results from the set of search results, a set of the search queries that were previously used to provide search results pages that included the links with which the user interactions occurred to access the given web page;
determining, for each given search query in the set of search queries, a feature score based on a user dwell time at the given web page following user interaction with the links to the given web page that were provided in the search results pages for the given search query, including assigning a higher scores for higher dwell times at the given web page;
storing, based on the determined features scores, one or more of the search queries from the identified set of search queries as keywords for the given web page, including storing the given query having a best feature score as a given keyword for the given web page;
receiving a request for content to be displayed with the given web page;
selecting content for display with the given web page based on the given keyword for the given web page matching terms used to distribute the content; and
transmitting, via a network, the selected content for display with the given web page responsive to the request for content.

7. The system of claim 6, wherein at least one search query in the set of search queries comprises one or more n-grams.

8. The system of claim 7, comprising determining a weight for each n-gram based on a number of times links to the given web page are selected when the n-gram is included in the at least one search query that was used to present a search results page that includes the links to the given web page.

9. The system of claim 8, wherein determining the weight comprises determining the weight for each n-gram based, at least in part, on a number of conversions that occur after selections of the link for the given web page.

10. The system of claim 8, comprising filtering one or more n-grams from the search queries based on the weight associated with the n-gram being below a predetermined value.

11. A computer-readable storage device storing instructions that, when executed by one or more data processors, cause the one or more data processors to perform operations comprising:
accessing search queries that were previously submitted by users and a corresponding set of search results that were previously presented in search results pages for each of the search queries, each search result in the set of the search results including a link to a corresponding web page;
identifying, for a given web page that was previously accessed through user interaction with links included in search results from the set of search results, a set of the search queries that were previously used to provide search results pages that included the links with which the user interactions occurred to access the given web page;
determining, for each given search query in the set of search queries, a feature score based on a user dwell time at the given web page following user interaction with the links to the given web page that were provided in the search results pages for the given search query, including assigning a higher scores for higher dwell times at the given web page;
storing, based on the determined features scores, one or more of the search queries from the identified set of search queries as keywords for the given web page, including storing the given query having a best feature score as a given keyword for the given web page;
receiving a request for content to be displayed with the given web page;
selecting content for display with the given web page based on the given keyword for the given web page matching terms used to distribute the content; and
transmitting, via a network, the selected content for display with the given web page responsive to the request for content.

12. The computer-readable storage device of claim 11, wherein at least one search query in the set of search queries comprises one or more n-grams.

13. The computer-readable storage device of claim 12, comprising determining a weight for each n-gram based on a number of times links to the given web page are selected when the n-gram is included in the at least one search query that was used to present a search results page that includes the links to the given web page.

14. The computer-readable storage device of claim 13, wherein determining the weight comprises determining the weight for each n-gram based, at least in part, on a number of conversions that occur after selections of the link for the given web page.

15. The computer-readable storage device of claim 13, comprising filtering one or more n-grams from the search queries based on the weight associated with the n-gram being below a predetermined value.

* * * * *